Patented Jan. 18, 1949

2,459,706

UNITED STATES PATENT OFFICE 2,459,706

PREPARATION OF AMIDES

John A. King, Albany, N. Y., assignor, by mesne assignments, to Winthrop-Stearns Inc., New York, N. Y., a corporation of Delaware No Drawing. Application December 8, 1945, Serial No. 633,875

7 Claims. (Cl. 260—561)

This invention relates to processes for converting aliphatic mercaptans and secondary and tertiary alcohols into carboxylic acids and derivatives thereof, under the conditions of the Willgerodt reaction. Particularly, the invention relates to the treatment of compounds of the types hereinabove recited with an ammonium polysulfide or with an ammonia and sulfur, wherein the ammonia or ammonium group may be an organically substituted ammonia or ammonium group, either in aqueous or substantially anhydrous media, and with or without the addition of inert, solvents, the resulting carboxylic acid derivatives comprising free carboxylic acids, salts of carboxylic acids, amides of carboxylic acids, thioamides, N-di- and mono-substituted amides and thioamides, and hydrolytic products of all of these.

This application is a continuation-in-part of my prior U. S. applications, Serial Nos. 607,671 (now U. S. Patent 2,456,785) and 607,672, filed July 28, 1945.

In 1887 Willgerodt discovered that aryl alkyl ketones react at high temperature and under pressure with yellow ammonium polysulfide to form crystalline nitrogenous materials [Ber., 20, 2467 (1887)]. The next year he reported that these products were the amides of the aryl-substituted aliphatic acids containing the same number of carbon atoms as the starting ketones, accompanied by the ammonium salts of these acids [Ber., 21, 534 (1888)]. During the next twenty-four years he extended the reaction, which has in recent years borne his name, to a host of aryl lower alkyl ketones [J. prakt. Chem., (2), 80, 183, 192 (1909); (2) 81, 74, 382 (1910); (2), 84, 383 (1911)].

The classical Willgerodt reaction may be illustrated by the following equation:

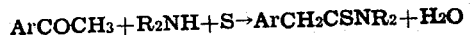

$Ar—CO—(CH_2)_n—CH_3 \xrightarrow{(NH_4)_2S_x} Ar—CH_2(CH_2)_n—CONH_2$

During the past few years the technique of conducting this reaction has been improved, and extended to additional aryl alkyl ketones. Kindler [Arch. Pharm., 272, 236 (1934); Ber., 74, 321 (1941)] introduced a variant of the reaction in which dimethylamine and sulfur are used in place of ammonium polysulfide. Schwenk [J. A. C. S., 64, 3051 (1942)] used morpholine and piperidine as the amines in Kindler's variant, with the resultant advantage that the reaction need not be carried out under pressure in a closed system. Modifications such as these where anhydrous conditions are employed result in the formation of nitrogen-substituted thioamides, according to the following equation:

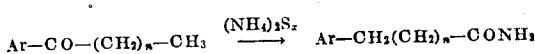

$ArCOCH_3 + R_2NH + S \rightarrow ArCH_2CSNR_2 + H_2O$

Fieser [J. A. C. S., 62, 1354 (1940)] added dioxane to the ammonium polysulfide, which modification allows the reaction with aryl alkyl ketones to proceed at a lower temperature.

Both Kindler and Schwenk showed that the aryl group can be substituted by certain radicals which are inert under the conditions of the Willgerodt reaction, for example, halo, alkyl, alkoxyl and thioether groups.

In the course of a study of the scope and mechanism of the Willgerodt reaction, I have discovered that the reaction is of much broader scope than heretofore realized. Thus not only the theretofore employed compounds which are aryl alkyl ketones, but also a wide variety of classes of compounds heretofore unsuspected of being useful for the purpose, such as dialkyl ketones, aralkyl alkyl ketones, cycloalkyl alkyl ketones, alicyclic ketones, aliphatic and aromatically substituted aliphatic mercaptans, secondary and tertiary alcohols, aliphatic organic halides, and a variety of unsaturated organic compounds including aliphatic- and aromatic-substituted olefins and halogen derivatives thereof, undergo transformation under the conditions of the Willgerodt reaction and thus may be converted under suitable conditions into carboxylic acids and derivatives thereof having the same number of carbon atoms as the organic compounds from which they are formed. Suitable conditions for the reactions I have discovered include heating with the following reagents; the term "reagent of the Willgerodt reaction" as used herein comprises any of these compositions:

1. Aqueous ammonium polysulfide.
2. Substantially anhydrous ammonium polysulfide.
3. Aqueous ammonium polysulfide wherein the ammonium group is a substituted ammonium group.
4. Substantially anhydrous ammonium polysulfide wherein the ammonium group is a substituted ammonium group.
5. Sulfur and aqueous ammonia.
6. Sulfur and substantially anhydrous ammonia.
7. Sulfur and aqueous amines or substituted ammonias.
8. Sulfur and substantially anhydrous amines or substituted ammonias.

9. Any of the above-mentioned reagents with the addition of an inert solvent such as dioxane, pyridine, primary alcohols, hydrocarbons and the like.

When substantially anhydrous conditions prevail the carboxylic acid derivative resulting is a thioamide of an acid having the same number of carbon atoms as the organic substance reacted. These thioamides contain the group —CSNRR' where R and R' are hydrogen or aliphatic organic radicals. When water is present the carboxylic acid derivatives resulting include the amide of an acid having the same number of carbon atoms as the starting compound and containing the grouping —CONRR', where R and R' are hydrogen or aliphatic organic radicals, and hydrolysis products thereof, that is, the corresponding carboxylic acid and salts thereof.

The subject matter claimed in the instant application is directed to the extended Willgerodt reaction as applied to certain classes of mercaptans and alcohols.

The mercaptans which may be used in the practice of my invention include all of the usual aliphatic mercaptans, both saturated and unsaturated, having the general formula RSH, wherein R may be a primary (e. g., ethyl or decyl mercaptans), secondary (e. g., isopropyl mercaptan) or tertiary (e. g., tertiary-butyl mercaptan) aliphatic radical. R may be saturated or it may contain unsaturated groups as in the case of allyl mercaptan, and it may contain an alicyclic, heterocyclic or aromatic radical. R may be aralkyl (e. g., benzyl and alpha- and beta-phenylethyl mercaptans), and the aralkyl group may be primary, secondary or tertiary. Further, the aryl substituent of the aralkyl group may be substituted with radicals which are unaffected under the conditions of the Willgerodt reaction, such as halogen, alkyl, aralkyl, aryl, ether and thio ether radicals. In the case where R is aliphatic it may be straight- or branched-chain, or cyclic.

The hydroxyl derivatives which may be used comprise all the usual secondary and tertiary aliphatic and aromatic-substituted aliphatic alcohols, both saturated and unsaturated. The alcohol may be substituted with one or more aryl nuclei, as for example phenylmethylcarbinol, and these aryl nuclei in turn may be substituted with radicals which are unaffected under the conditions of the Willgerodt reaction.

The conditions of the modifications of the Willgerodt reaction which comprises my invention are, in general, treatment of the organic compound at an elevated temperature with an ammonium polysulfide or an ammonia and sulfur, it being understood that the ammonium group or ammonia may be substituted with organic radicals as herein disclosed. If necessary, the reaction can be carried out in a closed system in order to prevent the loss of volatile constituents. Pressure conditions are often desirable. Inert solvents such as dioxane, benzene pyridine, primary alcohols, and water may be advantageously employed to render the complex mixtures homogeneous and to reduce the total vapor pressure of the heated reaction mass.

Elevated temperatures are usually required for the Willgerodt reaction. The range of temperature which is suitable can be quite wide. Temperatures as high as 330° C. were used by Willgerodt and are suitable for my invention. However, such high temperatures cause more or less resinification of the compound used, with consequent reduction in yield of the acid derivative.

When an organic solvent is added to an aqueous reaction mixture, temperatures of about 150° C. are to be preferred. If no solvent is so employed, the optimum temperature is in the range of 190–210° C. If the reaction mixture does not contain water, as when anhydrous ammonia or an amine and sulfur are used, the reaction temperature can be as low as the range of 100–150° C. Amines having boiling points in the neighborhood of 100° C. may be used under reflux. The reaction generally requires moderately long periods of time. With aqueous ammonium polysulfide the period varies from 4 to 30 hours. When an organic solvent is added, the time may be decreased to some extent. If water is excluded from the reaction mixture, the reaction often proceeds quite rapidly, in some instances being complete in much less time than required for those reactions carried out in the presence of water.

Secondary and tertiary alcohols and mercaptans react less readily than do olefins and other unsaturated compounds, and for this reason temperatures higher than 200° C. and long periods of time are often necessary. Secondary alcohols are more inert than tertiary and more vigorous treatment may be required. Tertiary mercaptans appear to be less reactive than secondary mercaptans, which in turn are somewhat less reactive in general than the primary mercaptans. The optimum conditions for each class of compound used are readily ascertained by simple experiments. Representative conditions are illustrated in the appended examples.

The Willgerodt reaction is but one of several reactions which may occur. There are a number of competing reactions, all of which take place to some extent, with resulting decreases in yields of acid derivatives. Among these are reduction of the reactive group of the compound to the methylene grouping, formation of substituted thiophenes, cleavage of the compound to smaller fragments, and resinification of the compound. These reactions are undesirable and can be eliminated by the proper selection of conditions of temperature, time, and proportions of reagents.

The ammonium polysulfide reagent which I prefer to use is that discovered by Willgerodt to give the most satisfactory results. It is made by saturating concentrated aqueous ammonium hydroxide at ordinary temperature with hydrogen sulfide and then dissolving in the resulting solution that weight of sulfur equal to one-tenth the weight of the solution, thereby obtaining a yellow ammonium polysulfide solution. It is, of course, possible to modify the proportions of the components of this solution considerably. In general, however, such changes are not desirable since they promote side-reactions. If, for instance, the relative amount of the sulfur is increased, the amount of cleavage of the compound is greater. If it is decreased, there is more reduction of the reactive group of the compound to the methylene group. There must, of course, be elemental or polysulfidic sulfur present for the conversion of compounds of the type herein disclosed to acids or derivatives thereof. If there is none, no acid derivative is formed but rather thiophene derivatives are obtained when the organic compound has the carbon skeleton Ar—C—C, wherein Ar is an aromatic radical.

The relative amounts of compound and of ammonium polysulfide solution may vary over a fairly wide range. I have found that 5 parts of ammonium polysulfide solution to 1 part of the organic compound gives satisfactory yields of acid derivatives in most cases and these amounts are preferred. In general the sulfur organic compound molar ratio should be in the range of 1 to 10. Even higher ratios are effective, although uneconomical. While it is necessary that the specific optimum conditions for the reaction be worked out by experiment for each substance, the process which I disclose and which is illustrated in the appended examples will give satisfactory results with any organic compound of the type herein contemplated.

I have further discovered that the Willgerodt reaction may be carried out under several different sets of conditions. The usual conditions of the reaction are treatment with yellow ammonium polysulfide at elevated temperature and if necessary under pressure in order to retain volatile material. A solvent such as dioxane may be added in order to produce a homogenous reaction mass. A modification of these conditions is the use of sulfur and an aliphatic amine or ammonia instead of ammonium polysulfide. If the amine is sufficiently high-boiling it is unnecessary to carry out the reaction under pressure. Also instead of ammonium polysulfide, substituted ammonium polysulfides can be employed. For example 30% aqueous dimethylamine may be saturated with hydrogen sulfide and treated with sulfur. This reagent, when heated with a compound of the type herein contemplated will give rise to the N,N-dimethylamide of a carboxylic acid.

I have discovered that the presence of hydrogen sulfide in the reaction is unnecessary, and in certain instances even detrimental. This discovery enables one to conduct Willgerodt reactions by treating the unsaturated hydrocarbon derivative, ketone, aldehyde, secondary or tertiary alcohol, mercaptan, or organic halide with sulfur and ammonia or a substituted ammonia of the general formula $RR'R''N$ wherein $R$, $R'$ and $R''$ are hydrogen or aliphatic groups such as alkyl and cycloalkyl, or where $R$ and $R'$ together form a non-aromatic cyclic nucleus and $R''$ is hydrogen or an aliphatic group. Thus hydrogen sulfide, instead of being an essential reactant in the Willgerodt reaction, it but an optional agent, and the appended claims are to be interpreted in this light. The reaction proceeds with or without the presence of water. If water is present, carboxylic acids and amides thereof are formed. If water is absent, salts of dithioacids having the grouping —$CSSH.NRR'R''$ and thioamides having the grouping —$CSNR'R''$ result, wherein $R$, $R'$ and $R''$ are hydrogen or the groups listed hereinabove.

As is the situation when ammonium polysulfide is used as the reagent, the proportions of sulfur and amine or ammonia to compound may be varied over fairly broad ranges. In any particular case the optimum conditions of temperature, time, solvent, and proportions of reagents are readily determined. In egeneral it may be said that 1 mole of the organic compound to be converted, 1½ to 3 moles of sulfur and 2 to 5 moles of the amine or ammonia will result in a satisfactory conversion of the compound to an acid derivative. Temperatures somewhat lower than 200° C. are usually suitable for the reaction, and often the length of time need be only 1 to 2 hours and in certain instances less than an hour.

While it has been recognized that hydrogen sulfide is not a required component of the reagent for the Willgerodt reaction when an amine is one of the constituents, it has not been previously known that hydrogen sulfide is unessential when ammonia, either aqueous or anhydrous, is employed in the reagent. On the contrary, during the 58 years in which the Willgerodt reaction has been used as a synthetic method of organic chemistry, hydrogen sulfide has invariably been a component of the reagent whenever ammonia has been used, that is, the ammonia has been saturated with hydrogen sulfide. It has generally been thought that hydrogen sulfide was an essential component of the Willgerodt reagent whenever ammonia was an ingredient. My discovery enables one to carry out the reaction without this substance. This improvement greatly simplifies the manipulation required, since all that one need do to prepare the reagent is add powdered sulfur to ammonia, either aqueous or anhydrous, or to an amine. It eliminates handling the disagreeable and toxic hydrogen sulfide gas and the time required to saturate the ammonia with it is saved. In many instances the yields are actually increased by the use of this modification. For example, styrene may be converted by this improved procedure into a mixture of phenylacetic acid and phenylacetamide in a total yield of 93%, compared to 60–70% yield when hydrogen sulfide is added to the reagent.

The Willgerodt reaction may be carried out in aqueous or in anhydrous media with or without inert solvents. Inert solvents which are suitable include water, primary alcohols, dioxane, pyridine, benzene and low-boiling hydrocarbons and other organic substances which are unaffected by the reagent at elevated temperatures. It is desirable that the solvent be miscible with ammonia and in certain instances with water, although water-miscibility is not always essential. If the reaction is carried out in the presence of water, carboxylic acids or amides thereof are formed. If no water is present the products are thioamides.

The products resulting from treating a compound of the type herein disclosed according to my invention are one or more of the following: free carboxylic acids, having the grouping —$COOH$; salts of carboxylic acids, having the grouping —$COONHRR'R''$, wherein $R$, $R'$ and $R''$ represent hydrogen or aliphatic radicals; amides of carboxylic acids, having the grouping —$CONH_2$; nitrogen-substituted amides of carboxylic acids, having the grouping —$CONRR'$ wherein $R$ and $R'$ represent hydrogen or aliphatic radicals; thioamides, having the grouping —$CSNH_2$; nitrogen-substituted thioamides having the grouping —$CSNRR'$ wherein $R$ and $R'$ represent hydrogen or aliphatic organic radicals; thioacids having the grouping —$CSSH$; salts of thioacids, having the grouping —$CSSHNRR'R''$ wherein $R$ and $R'$ represent hydrogen or non-aromatic radicals; and nitriles having the grouping —$CN$, the latter possibly being reaction products obtained from amides and/or thioamides upon loss of the elements of water or hydrogen sulfide. The entire group of compounds hereinabove shown is referred to in the specification and appended claims as carboxylic acid derivatives.

The thioamides may, if desired, be hydrolyzed to amides of carboxylic acids or to carboxylic acids. However, thioamides, especially those which are unsubstituted on nitrogen and have the grouping —$CSNH_2$, are valuable products of themselves and hitherto have been accessible only by indirect and costly procedures. They may be converted to aldehydes by simple reductive operations.

The following examples are intended merely to illustrate representative conditions of temperature, time, proportions of reagents, and solvents which are effective in practicing my invention, and are not intended to limit it in any way. It will be apparent that numerous modifications may be made without departing from the scope or spirit of my invention.

Example 1

Ammonium polysulfide is prepared by the method of Willgerodt and Merk [J. prakt. Chem., (2) 80, 192 (1909)] by saturating concentrated ammonium hydroxide at room temperature with hydrogen sulfide and stirring into the solution the amount of sulfur equal to one-tenth the weight of the solution.

1 part of ethyl mercaptan and 5 parts of ammonium polysulfide solution are heated for 14 hours at 200° C. in a closed system. The reaction mixture is evaporated to dryness and the residue extracted with hot chloroform. Evaporation of the chloroform extract leaves a crystalline residue of acetamide which after recrystallization from a mixture of benzene and petroleum ether melts at 80–81° C. The mixed melting point with an authentic sample of acetamide is undepressed.

In a similar manner n-propyl mercaptan is transformed into propionamide of M. P. 77–78° C., alone or when mixed with pure propionamide. Benzene is used as the extraction solvent and crystallization is from benzene diluted with petroleum ether.

n-Butyl mercaptan, treated as above for n-propyl mercaptan, gives rise to n-butyramide of M. P. 113–114° C.

Example 2

3 parts of n-octyl mercaptan and 15 parts of ammonium polysulfide reagent are heated for 5 hours at 200° C. in a closed system. Colorless crystals of caprylamide are formed. These melt at 104–105° C. without purification and do not depress the melting point of authentic caprylamide.

In a similar manner, n-decyl mercaptan gives a quantitative yield of crystals of capramide, melting at 97–98° C. after recrystallization from ether.

Example 3

1 part of benzyl mercaptan and 5 parts of ammonium polysulfide reagent heated in a sealed tube for 12 hours at 200° C. result in a 53% yield of colorless crystalline benzamide of M. P. 125–127° C. which does not depress the M. P. of an authentic sample of benzamide.

Example 4

1 part of 1-phenylethyl mercaptan and 5 parts of ammonium polysulfide solution at 200° C. for 4 hours in a sealed tube result in a 44% yield of phenylacetamide, which is isolated by continuous extraction with benzene. Acidification of the extracted aqueous layer followed by extraction with ether yields 18% of phenylacetic acid.

Example 5

1 part of 2-phenylethyl mercaptan and 5 parts of ammonium polysulfide solution at 205° C. for 4 hours in a closed system form a 95% yield of phenylacetamide of M. P. 153–154° C., undepressed on admixture with an authentic sample. The phenylacetamide is isolated by evaporation of the reaction mixture of dryness, leaching of the residue with hot ethanol, and evaporation of the ethanol.

Example 6

1 part of isobutyl mercaptan and 5 parts of ammonium polysulfide reagent are heated in a sealed reactor for 14 hours at 200° C. The reaction mixture is washed out with water and continuously extracted with benzene for 2 hours. The benzene is removed and the residue slurried with petroleum ether, colorless crystals of isobutyramide of M. P. 125–126° C. being formed. The mixed M. P. with an authentic sample of isobutyramide is not depressed.

In a similar manner, isopropyl mercaptan can be converted into propionamide of M. P. 76–78° C. Allyl mercaptan by the same procedure is transformed into propionamide of M. P. 77–79° C. which does not depress the M. P. of an authentic sample of propionamide.

Example 7

1 mole of 2-phenethyl mercaptan, 2 moles of sulfur and 5 moles of aqueous 28% ammonia are heated in a closed vessel for 4 hours at 200 ± 5° C. The crystalline mass is washed out of the vessel with water and the resulting mixture boiled and filtered. The clear filtrate is concentrated to a small volume and chilled. A 92% yield of phenylacetamide of M. P. 155° C. crystallizes out and is removed by filtration.

In an analogous experiment, phenylmethylcarbinol is converted to phenylacetamide in 33% yield.

Example 8

1 mole of n-decyl mercaptan is heated with 2 moles of sulfur and 5 moles of aqueous ammonia in a closed vessel for 12 hours at 200±5° C. The reaction mass is extracted with benzene and the combined extracts are washed several times with water. Evaporation of the solvent leaves a quantitative yield of capramide. One recrystallization from benzene gives pure capramide of M. P. 97–98° C. which is identical with an authentic sample of capramide.

Example 9

1 mole of tertiary-butyl alcohol, 2 moles of sulfur and 5 moles of aqueous ammonia are reacted at 200±5° C. for 12 hours in a closed system. The reaction mixture is continuously extracted with benzene for 2 hours. The extract is evaporated and the residue recrystallized from benzene, yielding isobutyramide of M. P. 126–127° C., identical with authentic material.

Example 10

3 parts of allyl alcohol and 15 parts of ammonium polysulfide reagent are reacted at 200° C. for 16 hours in a closed system. The mixture is taken to dryness and extracted with benzene. Removal of the benzene gives a 34% yield of propionamide of M. P. 74–76° C.

Example 11

1 part of tertiary-butyl alcohol and 3 parts of ammonium polysulfide solution are heated to 200° C. for 14 hours in a closed vessel. The cooled reaction mixture is extracted continuously with benzene for 2 hours. The benzene is concentrated and chilled, resulting in white crystalline plates of isobutyramide having a melting point of 125–127° C., alone or mixed with authentic isobutyramide.

Tertiary-butyl mercaptan, treated in a similar fashion, is converted to isobutyramide of M. P. 125–126° C.

Example 12

3 parts of phenylmethylcarbinol and 15 parts of ammonium polysulfide solution are heated for 4 hours at 210±5° C. in a pressure tube. The solid material is removed by filtration and the mother liquor extracted with ether from which there is obtained more of the product. A 48% yield of phenylacetamide is obtained in the form of white plates of M. P. 156.5–157° C. after one recrystallization from water. The mixed melting point with an authentic sample of phenylacetamide is undepressed.

Example 13

Phenylisopropylcarbinol (1-phenyl-2-methyl-1-propanol), treated with 5 times its weight of ammonium polysulfide reagent for 6 hours at 200° C., is converted into alpha-methyl-beta-phenylpropionamide of M. P. 105–107° C. The amide is isolated from the reaction mixture by extraction with ether. The ether extract is washed with water and evaporated, and the residue is crystallized from water.

Example 14

1 part of diethylcarbinol (3-pentanol) and 5 parts of ammonium polysulfide solution at 215±5° C. for 4 hours give rise to valeramide of M. P. and mixed M. P. of 99–102° C.

What I claim is:

1. A process for preparing carboxylic acid amides which comprises heating together at an elevated temperature in excess of 100° C. an aqueous mixture comprising essentially sulfur, ammonia, and a member of the group consisting of alkyl mercaptans, aralkyl mercaptans, secondary alcohols, and tertiary alcohols.

2. A process for preparing carboxylic acid amides which comprises heating together at an elevated temperature an aqueous mixture comprising essentially sulfur, ammonia and an alkyl mercaptan.

3. A process for preparing carboxylic acid amides which comprises heating together at an elevated temperature an aqueous mixture comprising essentially sulfur, ammonia and a secondary alcohol.

4. A process for preparing carboxylic acid amides which comprises heating together at an elevated temperature an aqueous mixture comprising essentially sulfur, ammonia, and a tertiary alcohol.

5. A process for preparing carboxylic acid amides which comprises heating together at an elevated temperature an aqueous mixture comprising essentially 1.5 to 3 moles of sulfur, 2 to 5 moles of ammonia and 1 mole of an alkyl mercaptan.

6. A process for preparing carboxylic acid amides which comprises heating together at an elevated temperature an aqueous mixture comprising essentially 1.5 to 3 moles of sulfur, 2 to 5 moles of ammonia and 1 mole of a secondary alcohol.

7. A process for preparing carboxylic acid amides which comprises heating together at an elevated temperature an aqueous mixture comprising essentially 1.5 to 3 moles of sulfur, 2 to 5 moles of ammonia and 1 mole of a tertiary alcohol.

JOHN A. KING.

REFERENCES CITED

The following references are of record in the file of this patent:

UNITED STATES PATENTS

| Number | Name | Date |
|---|---|---|
| 1,854,480 | Mnookin | Apr. 19, 1932 |
| 2,061,019 | Carter et al. | Nov. 17, 1936 |
| 2,124,598 | Turner | July 26, 1938 |
| 2,341,453 | Lieber et al. | Feb. 8, 1944 |
| 2,342,582 | Hooker et al. | Feb. 22, 1944 |
| 2,374,963 | Voss | May 1, 1945 |

OTHER REFERENCES

Willgerodt in "Ber. Deut. Chem. Ges.," vol. 20 (1887), page 2467; ibid., vol. 21 (1888), page 534.

Willgerodt in "J. Prak. Chem.," vol. 80, (1909), pages 183–200.

Willgerodt et al.: "J. Prak. Chem.," vol. 81 (1910), pages 74–85, 382–402; ibid., vol. 84, page 383.